US009731429B2

(12) United States Patent
Yazawa et al.

(10) Patent No.: US 9,731,429 B2
(45) Date of Patent: Aug. 15, 2017

(54) STATIONARY BLADE SUPPORT DEVICE CONFIGURED SO THAT STATIONARY BLADE IS NOT DEFORMED, PAPER CUTTING DEVICE WITH STATIONARY BLADE SUPPORT DEVICE, AND PRINTER WITH PAPER CUTTING DEVICE

(71) Applicants: Shou Yazawa, Kawasaki (JP); Yukio Yoshioka, Kawasaki (JP)

(72) Inventors: Shou Yazawa, Kawasaki (JP); Yukio Yoshioka, Kawasaki (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 14/301,636

(22) Filed: Jun. 11, 2014

(65) Prior Publication Data

US 2014/0312552 A1 Oct. 23, 2014

Related U.S. Application Data

(63) Continuation of application No. 13/993,518, filed as application No. PCT/JP2011/056499 on Mar. 11, 2011, now Pat. No. 8,820,204.

(30) Foreign Application Priority Data

Dec. 15, 2010 (JP) ................................ 2010-279303

(51) Int. Cl.
*B62D 1/08* (2006.01)
*B26D 7/26* (2006.01)
(Continued)

(52) U.S. Cl.
CPC ........... *B26D 7/2614* (2013.01); *B26D 1/085* (2013.01); *B41J 11/70* (2013.01);
(Continued)

(58) Field of Classification Search
CPC .......... B26D 2007/2685; B26D 7/2628; B26D 1/085
(Continued)

(56) References Cited

U.S. PATENT DOCUMENTS 3,661,488 A * 5/1972 Latreille ................. B29C 49/50 425/196
4,448,101 A 5/1984 Templeton
(Continued)

FOREIGN PATENT DOCUMENTS

CN 1483587 A 3/2004
JP 11123692 A 5/1999
(Continued)

OTHER PUBLICATIONS

Communication dated Jul. 28, 2014, from the State Intellectual Property Office of the People's Republic of China in counterpart Chinese Application No. 201180060216.1.
(Continued)

*Primary Examiner* — Kenneth E Peterson
(74) *Attorney, Agent, or Firm* — Sughrue Mion, PLLC

(57) ABSTRACT

A fixed blade support device includes a biasing member and a fixed blade support member (11). The fixed blade support member (11) includes a base surface portion (11*a*), an upright surface portion (11*b*), and a retainer portion (11*c*). The upright surface portion (11*b*) extends from the base surface portion (11*a*) in a biasing direction so as to close a rear side of a root portion of a fixed blade (12) on an opposite side to a blade edge portion thereof, and is configured to prevent the fixed blade (12) from being disengaged in a direction of engagement with a movable blade. The retainer portion (11*c*) extends from the upright surface portion (11*b*) so as to cover the root portion of the fixed blade (12), and
(Continued)

is configured to prevent the fixed blade (12) from being disengaged in the biasing direction.

6 Claims, 7 Drawing Sheets

(51) Int. Cl.
*B26D 1/08* (2006.01)
*B41J 11/70* (2006.01)
*B26D 7/00* (2006.01)

(52) U.S. Cl.
CPC .................. *B26D 2007/005* (2013.01); *B26D 2007/2685* (2013.01); *Y10T 83/8776* (2015.04); *Y10T 83/8778* (2015.04); *Y10T 83/8854* (2015.04)

(58) Field of Classification Search
USPC ........................................... 83/582, 583, 636
See application file for complete search history.

(56) References Cited

U.S. PATENT DOCUMENTS

| | | | | |
|---|---|---|---|---|
| 5,377,572 | A | 1/1995 | Sonobe et al. | |
| 6,793,424 | B2 | 9/2004 | Yamada et al. | |
| 7,267,500 | B2 * | 9/2007 | Tsuchiya | B26D 1/085 400/621 |
| 7,273,325 | B2 * | 9/2007 | Watanabe | B26F 1/18 101/226 |
| 8,506,190 | B2 | 8/2013 | Kohira | |
| 8,662,771 | B2 | 3/2014 | Kawaguchi | |
| 2004/0057771 | A1 | 3/2004 | Yamada et al. | |
| 2005/0036820 | A1 | 2/2005 | Watanabe et al. | |
| 2007/0175307 | A1 * | 8/2007 | Ito | B26D 1/0006 83/583 |
| 2007/0199422 | A1 | 8/2007 | Kawaguchi | |
| 2010/0188470 | A1 * | 7/2010 | Tsuchiya | B26D 1/085 347/157 |
| 2011/0026999 | A1 * | 2/2011 | Kohira | B26D 1/085 400/621 |
| 2013/0104718 | A1 * | 5/2013 | Tai | B26D 1/085 83/582 |

FOREIGN PATENT DOCUMENTS

| | | | |
|---|---|---|---|
| JP | 2001-347485 | A | 12/2001 |
| JP | 2005-074598 | A | 3/2005 |
| TW | 490370 | B | 6/2002 |

OTHER PUBLICATIONS

Communication dated Oct. 22, 2014 from the Taiwan Intellectual Property Office in counterpart Taiwanese Patent Application No. 100144112.

* cited by examiner

STATIONARY BLADE SUPPORT DEVICE CONFIGURED SO THAT STATIONARY BLADE IS NOT DEFORMED, PAPER CUTTING DEVICE WITH STATIONARY BLADE SUPPORT DEVICE, AND PRINTER WITH PAPER CUTTING DEVICE

CROSS REFERENCE TO RELATED APPLICATIONS

This application is a continuation of U.S. application Ser. No. 13/993,518, filed Jun. 12, 2013, which is National Stage of International Application No. PCT/JP2011/056499 filed Mar. 11, 2011, claiming priority based on Japanese Patent Application No. 2010-279303, filed Dec. 15, 2010, the contents of all of which are incorporated herein by reference in their entirety.

TECHNICAL FIELD

This invention relates to a sheet cutting device to be mounted to a printer for performing printing on a sheet such as roll paper and a label sheet to automatically cut a printed sheet. More particularly, this invention relates to a fixed blade support device, which is used for the sheet cutting device to support, in a rockable manner, a fixed blade for cutting the printed sheet through engagement with a movable blade.

BACKGROUND ART

A sheet cutting device of this type includes a fixed blade unit and a movable blade unit. The fixed blade unit includes a fixed blade, a fixed blade support device for supporting the fixed blade in a rockable manner, and biasing means for pressurizing the fixed blade against a movable blade. On the other hand, the movable blade unit includes the movable blade, and drive means that is connected to a drive source and drives the movable blade in a stroke direction. Inside a printer, the fixed blade and the movable blade are arranged opposed to each other across front and back surfaces of a sheet that has undergone printing in a sheet passage.

A specific example of the sheet cutting device including a fixed blade support device is disclosed in, for example, Related Art Document 1 of this invention (Japanese Unexamined Patent Application Publication (JP-A) 2001-347485). Referring to FIGS. 1A and 1B illustrating merely a main part of a sheet cutting device similar to that disclosed in Related Art Document 1, the sheet cutting device includes a fixed blade 62, a movable blade 22 driven by drive means (not shown), a fixed blade support member 61 for supporting the fixed blade 62 in a rockable manner, and biasing means (not shown) for pressurizing the fixed blade 62 against the movable blade 22. In order to achieve an operation utilizing the principle of scissors described later, the fixed blade 62 is curved so that its center is protruded toward the movable blade 22, while the movable blade 22 includes a V-shaped blade edge portion and is driven in a stroke direction K. Note that, in some drawings including FIGS. 1A and 1B attached to this specification, for the sake of easy understanding of the description, the sizes and shapes of respective members are schematically illustrated in an exaggerated manner.

This sheet cutting device operates as follows. A sheet (not shown) conveyed between the fixed blade 62 and the movable blade 22 is temporarily stopped, and the drive means causes the movable blade 22 to move in the stroke direction K. The movable blade 22 includes the V-shaped blade edge portion, while the fixed blade 62 is curved toward the movable blade 22 and is provided in a press-contact (engagement) state to the movable blade 22 by the biasing means. Thus, the sheet is cut by the principle of scissors. The cut sheet is delivered from a printer (not shown).

Note that, as the degree of the curve of the fixed blade 62 becomes larger, paper powder is prevented from being generated, but the load on the drive means for the movable blade 22 increases. Therefore, the degree of the curve of the fixed blade 62 is designed considering the balance between reduction of the paper powder and relaxation of the load on the drive means.

As illustrated in FIGS. 2A and 2B, the fixed blade 62 is biased by biasing means 63 in a direction toward the movable blade 22. In this case, at both ends of the fixed blade 62 in a blade width direction in a root portion on the opposite side to a blade edge portion, protruding portions 62*b* are formed. On the other hand, the fixed blade support member 61 includes rectangle-hole shaped support hole portions 61*c* into which the protruding portions 62*b* of the fixed blade 62 are inserted. Each of the protruding portions 62*b* of the fixed blade 62 is loosely fitted to the support hole portion 61*c* of the fixed blade support member 61 so that the fixed blade 62 is supported by the fixed blade support member 61 in a rockable manner with the support hole portion 61*c* as a fulcrum. Note that, the loose fitting of the protruding portion 62*b* to the support hole portion 61*c* also acts to prevent the fixed blade 62 biased by the biasing means 63 from being disengaged from the fixed blade support member 61.

In the sheet cutting device illustrated in FIGS. 1A, 1B, 2A, and 2B, the fixed blade 62 is supported by the fixed blade support member 61 in a rockable manner, but in the actual case, the protruding portion 62*b* itself serving as the rocking fulcrum of the fixed blade 62 is also displaced at the time of engagement between the fixed blade 62 and the movable blade 22. That is, as the engagement of the movable blade (not shown) from the upper side of the figure with respect to the fixed blade 62 progresses as illustrated in FIG. 3B from an initial stage at which the movable blade starts engagement from the upper side with respect to the fixed blade 62 as illustrated in FIG. 3A, the fixed blade 62 rocks toward the lower side of the figure, and the protruding portion 62*b* of the fixed blade 62 is also displaced toward the lower side of the figure in the support hole portion 61*c* of the fixed blade support member 61.

However, in the support hole portion 61*c* of the fixed blade support member 61, the rectangle hole dimensions thereof, that is, positions of the hole wall surfaces in the horizontal direction and the vertical direction in the figure are defined, and hence when the engagement of the movable blade with respect to the fixed blade 62 progresses as illustrated in FIG. 3B, the protruding portion 62*b* of the fixed blade 62 abuts against the hole wall surface of the support hole portion 61*c* of the fixed blade support member 61, and thus the room for the press-contact force of the movable blade to escape is eliminated. As a result, the fixed blade 62 having the appropriately designed degree of curve as described above is flattened (the curve degree is reduced). In this case, the normal cutting operation of the sheet cutting device utilizing the principle of scissors is inhibited, and the generation amount of paper powder increases, which are not preferred.

DISCLOSURE OF THE INVENTION

It is therefore an object of this invention to provide a fixed blade support device which is capable of supporting a fixed blade in a rockable manner without causing deformation of the fixed blade at the time of engagement with a movable blade.

It is another object of this invention to provide a sheet cutting device that includes the fixed blade support device as described above and is capable of performing a normal cutting operation.

It is another object of this invention to provide a printer including the sheet cutting device as described above.

According to an exemplary embodiment of this invention, it is possible to obtain a fixed blade support device, which is used for a sheet cutting device to be mounted to a printer for performing printing on a sheet to cut a printed sheet, the fixed blade support device being configured to support, in a rockable manner, a fixed blade for cutting the printed sheet through engagement with a movable blade in an engagement direction, the fixed blade support device including: a biasing member for biasing the fixed blade in a biasing direction toward the movable blade; and a fixed blade support member for supporting, in a rockable manner, the fixed blade arranged through intermediation of the biasing member, in which the fixed blade support member includes: a base surface portion on which the fixed blade is arranged through intermediation of the biasing member; an upright surface portion that extends from the base surface portion in the biasing direction so as to close a rear side of a root portion of the fixed blade on an opposite side to a blade edge portion thereof, and is configured to prevent the fixed blade from being disengaged in the engagement direction; and a retainer portion that extends from the upright surface portion so as to cover the root portion of the fixed blade, and is configured to prevent the fixed blade from being disengaged in the biasing direction.

The retainer portion of the fixed blade support member may be formed so as to cover a center portion of the fixed blade in a blade width direction.

The fixed blade support device may further include a spring holder provided separately from the fixed blade support member, the spring holder being mounted between the base surface portion and a coil spring serving as the biasing member to position the coil spring. Further, the spring holder may include second retainer portions that cover respective both end portions in the blade width direction of the blade edge portion of the fixed blade arranged through intermediation of the coil spring, the second retainer portions being configured to prevent the fixed blade from being disengaged in the biasing direction together with the retainer portion of the fixed blade support member.

Each of the second retainer portions of the spring holder may include a part that closes a front side of each of both the end portions in the blade width direction of the blade edge portion of the fixed blade arranged through intermediation of the coil spring, and that prevents the fixed blade from being disengaged in the engagement direction together with the upright surface portion of the fixed blade support member.

The fixed blade support member may support, in a rockable manner, the fixed blade having a center portion in the blade width direction warped in a direction toward the movable blade. Further, the employed coil spring may be an odd number of coil springs having the same shape, which correspond to the center portion and both sides of the fixed blade in the blade width direction. Further, the spring holder may include such a positioning surface for the coil spring that gradually increases a height position thereof with respect to the base surface portion of the fixed blade support member from one of the odd number of coil springs, which corresponds to an outer side of the fixed blade in the blade width direction, to another one of the odd number of coil springs, which corresponds to the center portion thereof, to thereby apply a uniform biasing force to the fixed blade.

Further, according to an exemplary embodiment of this invention, it is possible to obtain a sheet cutting device, including: the above-mentioned fixed blade support device; the fixed blade; the movable blade; and the biasing member, the sheet cutting device being configured to cut a printed sheet through engagement of the movable blade with the fixed blade in the engagement direction across the printed sheet.

Still further, according to an exemplary embodiment of this invention, it is possible to obtain a printer, including: a structure for performing printing on a sheet; and the above-mentioned sheet cutting device.

BEST MODE FOR EMBODYING THE INVENTION

Figure 1B:
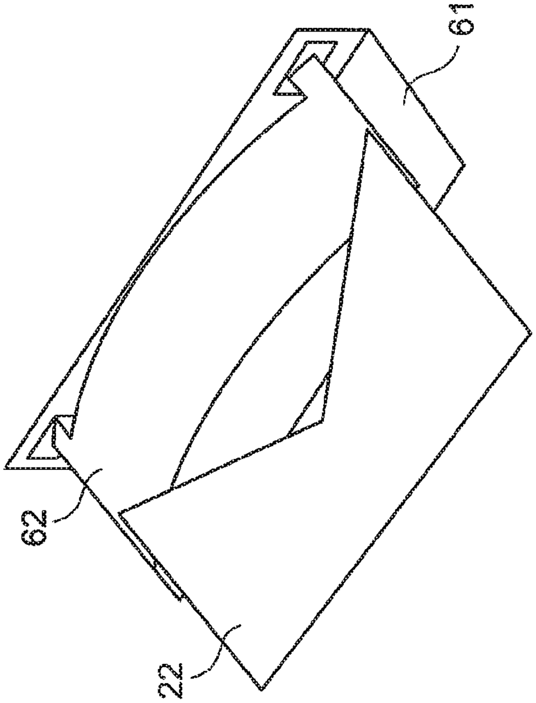
FIG. 1B PRIOR ART
FIGS. 1A and 1B are perspective views illustrating a main part of a sheet cutting device as the related art of this invention.
Figure 1A:
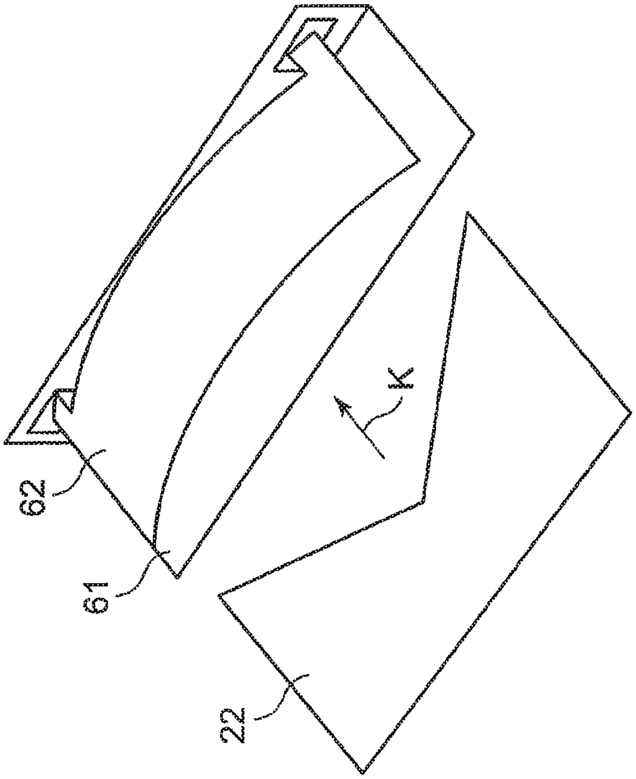
FIG. 1A PRIOR ART
Figure 2A:
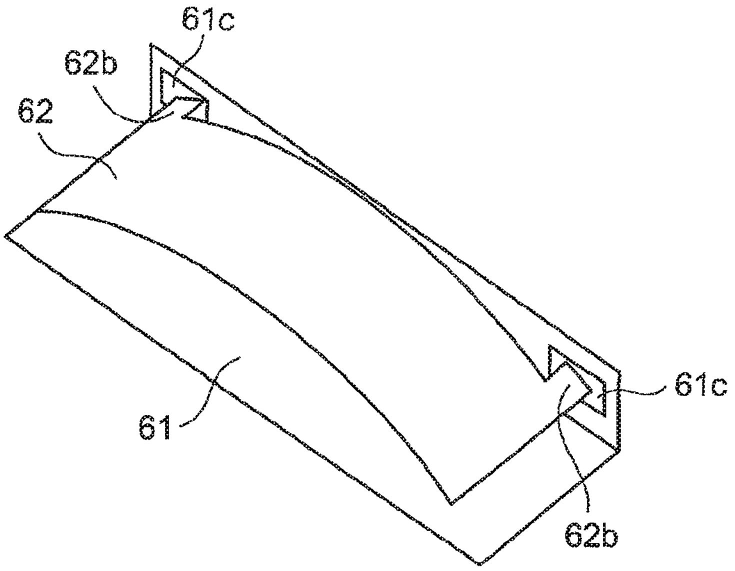
FIG. 2A PRIOR ART
FIGS. 2A and 2B are a perspective view and a sectional view, respectively, illustrating a fixed blade support device as the related art of this invention.
Figure 2B:
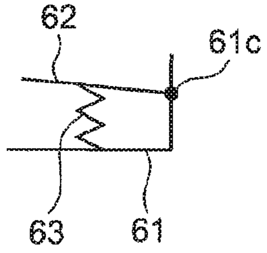
FIG. 2B PRIOR ART
Figure 3A:
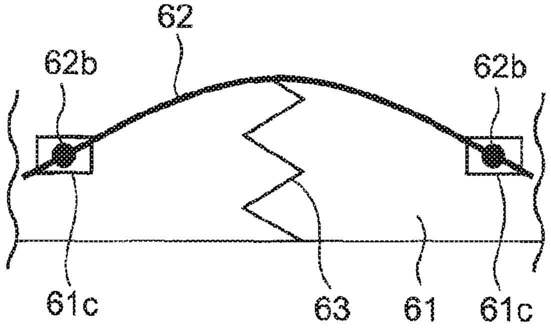
FIG. 3A PRIOR ART
FIGS. 3A and 3B are front views illustrating the fixed blade support device as the related art of this invention.
Figure 3B:
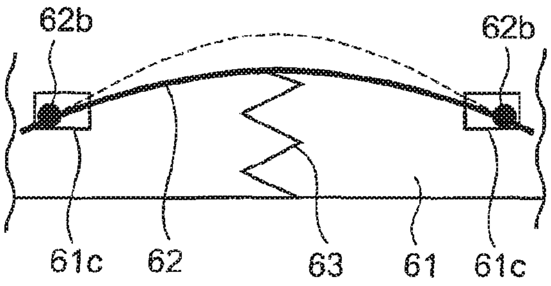
FIG. 3B PRIOR ART

A fixed blade support device of this invention is used for a sheet cutting device to be mounted to a printer for performing printing on a sheet to cut a printed sheet. The fixed blade support device is configured to support, in a rockable manner, a fixed blade for cutting the printed sheet through engagement with a movable blade in an engagement direction.

The fixed blade support device includes biasing member for biasing the fixed blade in a biasing direction toward the movable blade and a fixed blade support member for supporting, in a rockable manner, the fixed blade arranged through intermediation of the biasing member.

In particular, the fixed blade support member includes a base surface portion, an upright surface portion, and a retainer portion. The base surface portion is provided to arrange the fixed blade thereon through intermediation of the biasing member. The upright surface portion extends from the base surface portion in the biasing direction so as to close a rear side of a root portion of the fixed blade on the opposite side to a blade edge portion, and is configured to prevent the fixed blade from being disengaged in the engagement direction. The retainer portion extends from the upright surface portion so as to cover the root portion of the fixed blade, and is configured to prevent the fixed blade from being disengaged in the biasing direction.

The fixed blade support device of this invention is capable of supporting the fixed blade in a rockable manner without causing deformation of the fixed blade at the time of engagement with the movable blade.

That is, in this fixed blade support device, the retainer portion prevents the fixed blade from being disengaged merely in the biasing force positive direction of the biasing direction. Therefore, when the fixed blade rocks and the entire fixed blade including the root portion is displaced in a direction against the biasing force (press-contact force) of the biasing direction at the time of engagement with the movable blade, the fixed blade is not prevented from moving in both of the direction against the biasing force and the blade width direction. As a result, the fixed blade having an appropriately designed degree of curve is not deformed to be flattened, etc. Therefore, the normal cutting operation of the sheet cutting device utilizing the principle of scissors by the fixed blade and the movable blade is achieved, and the generation amount of paper powder does not increase.

In the following, with reference to the drawings, a fixed blade support device, a sheet cutting device, and a printer according to an embodiment of this invention are described.

Embodiment

The sheet cutting device according to the embodiment of this invention is a device to be mounted to a printer for performing printing on a sheet such as roll paper and a label sheet to automatically cut a printed sheet. Further, the fixed blade support device according to the embodiment of this invention is a device to be used for the sheet cutting device as described above, the fixed blade support device being configured to support, in a rockable manner, a fixed blade for cutting the printed sheet through engagement with a movable blade. Further, the printer according to the embodiment of this invention includes a structure for performing printing on a sheet, and the sheet cutting device as described above.

Figure 4:
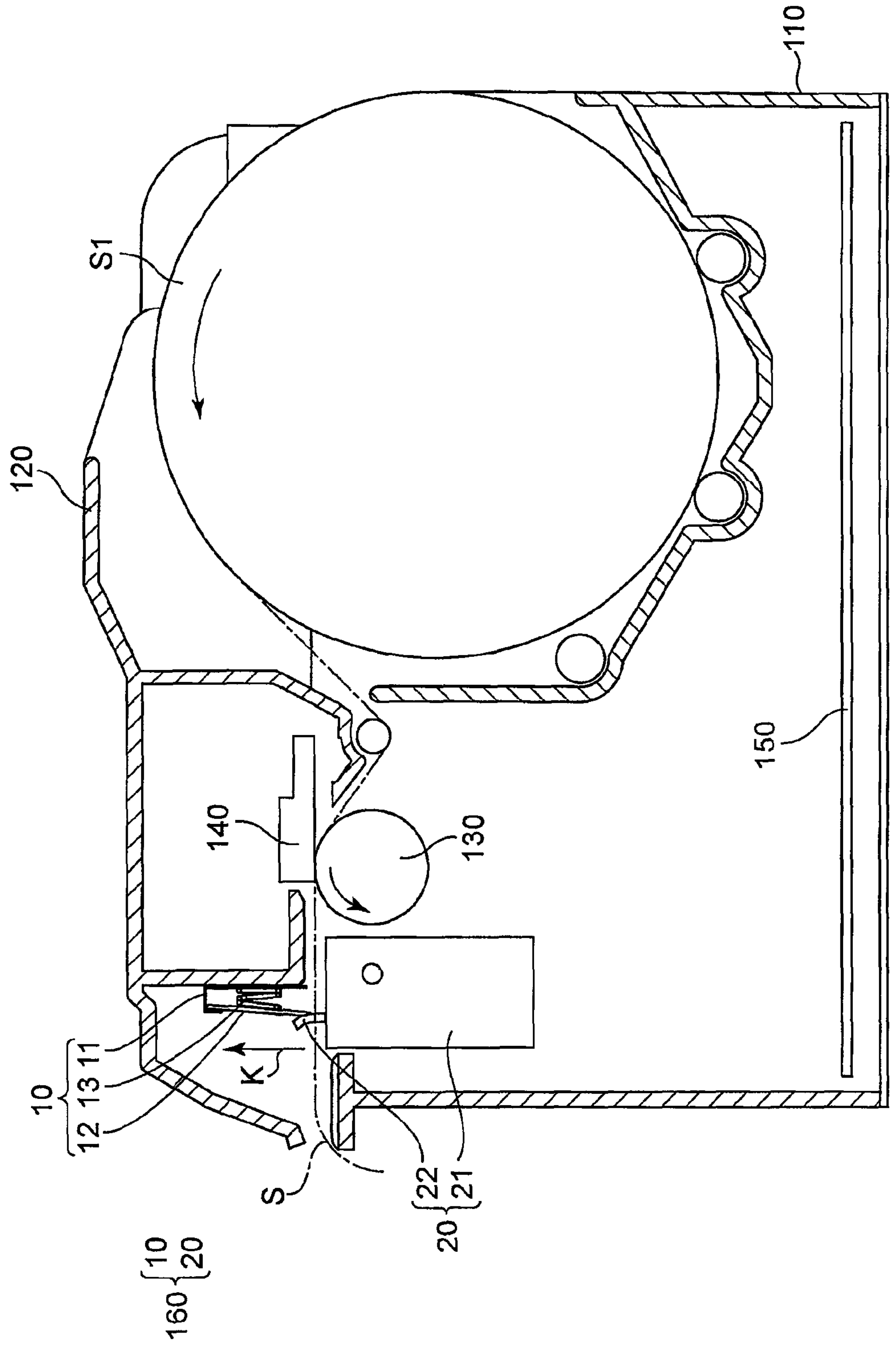
FIG. 4 is a view illustrating a printer having a sheet cutting device including a fixed blade support device mounted thereto according to an embodiment of this invention.

Referring to FIG. 4, the printer according to the embodiment of this invention includes a lower frame 110 which is to be loaded with roll paper S1, an upper frame 120 for openably covering the lower frame 110, a platen 130 which is mounted to the lower frame 110 and is configured to unroll a sheet S from the roll paper S1 in the left direction of the figure, and a printing head 140 of, for example, a thermal type, for performing printing on the sheet S on a circumferential surface of the platen 130.

This printer further includes a sheet cutting device 160 for cutting the sheet S that has undergone printing, and a control board 150 which is incorporated inside the lower frame 110, for controlling the operation of this printer.

The sheet cutting device 160 includes a fixed blade unit 10 which is mounted to the upper frame 120 and includes a fixed blade 12, and a movable blade unit 20 which is mounted to the lower frame 110 below the fixed blade unit 10 so as to be opposed thereto across the roll paper sheet S that has undergone printing and includes a movable blade 22.

The fixed blade unit 10 includes a fixed blade support device including a fixed blade support member 11, the fixed blade 12 supported by the fixed blade support member 11, and a coil spring 13 serving as a biasing member for pressurizing the fixed blade 12 against the movable blade 22.

The movable blade unit 20 includes a movable blade housing 21, the movable blade 22 supported inside the movable blade housing 21 so as to be movable in an engagement direction (stroke direction) K, a rack (not shown) mounted to the movable blade 22, and a pinion gear (not shown) which is connected to a drive source (not shown) and is configured to drive the rack and the movable blade 22 in the stroke direction K.

Note that, in order to achieve an operation utilizing the principle of scissors, the fixed blade 12 is curved (warped) so that its center is protruded toward the movable blade 22, while the movable blade 22 includes a V-shaped blade edge portion. The fixed blade 12 is curved at an appropriate degree considering the balance between reduction of paper powder to be generated at the time of cutting the sheet and relaxation of the load on a drive unit for the movable blade 22.

Figure 5A:
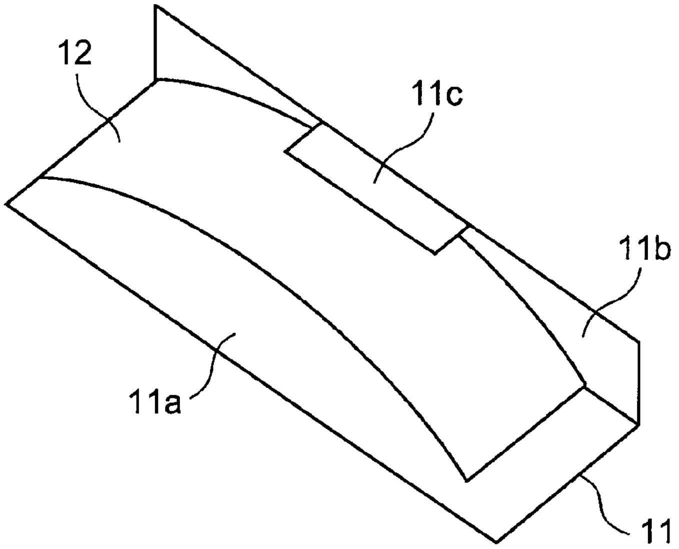
FIGS. 5A and 5B are a perspective view and a sectional view, respectively, illustrating the fixed blade support device according to the embodiment of this invention.
Figure 5B:
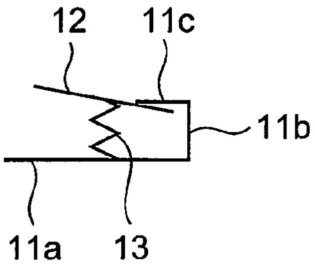
Figure 6:
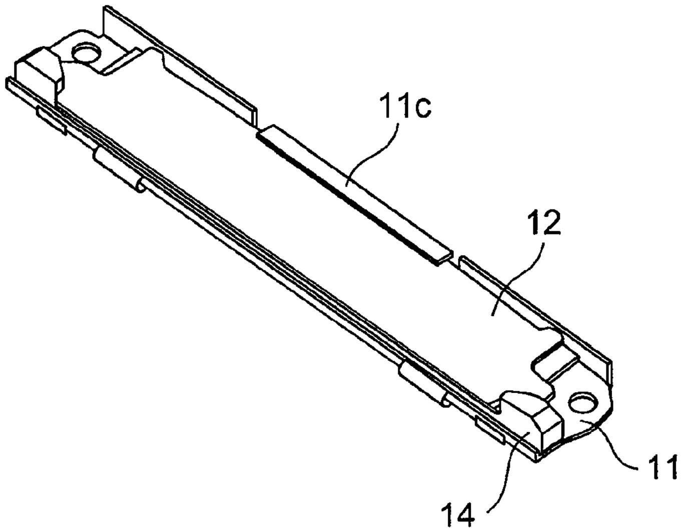
FIG. 6 is a perspective view illustrating the fixed blade support device according to the embodiment of this invention.

Referring to FIGS. 5A, 5B, and 6, this fixed blade support device includes the coil spring 13 serving as the biasing member for biasing the fixed blade 12 in the biasing direction that is directed to the movable blade 22, and the fixed blade support member 11 for supporting, in a rockable manner, the fixed blade 12 arranged through intermediation of the coil spring 13.

As illustrated particularly in FIGS. 5A and 5B, the fixed blade support member 11 includes a base surface portion 11*a*, an upright surface portion 11*b*, and a retainer portion 11*c*.

The base surface portion 11*a* is provided to arrange the fixed blade 12 thereon through intermediation of the coil spring 13.

The upright surface portion 11*b* extends from the base surface portion 11*a* in the biasing direction so as to close a rear side of a root portion of the fixed blade 12 on the opposite side to a blade edge portion, and is configured to prevent the fixed blade 12 from being disengaged in the direction of engagement with the movable blade.

The retainer portion 11*c* extends from the upright surface portion 11*b* so as to cover the root portion of the fixed blade 12, and is configured to prevent the fixed blade 12 from being disengaged in the biasing direction. In this embodiment, the retainer portion 11*c* is formed so as to cover a center portion of the fixed blade 12 in the blade width direction.

Figure 7:
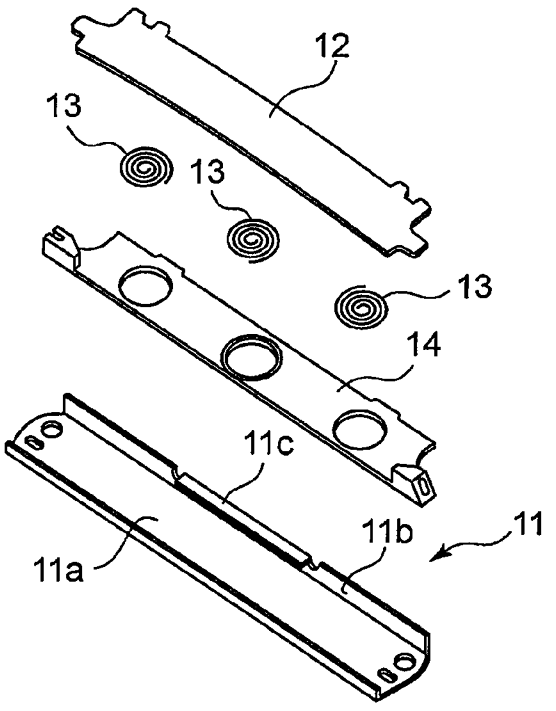
FIG. 7 is an exploded perspective view illustrating the fixed blade support device according to the embodiment of this invention.
Figure 8:
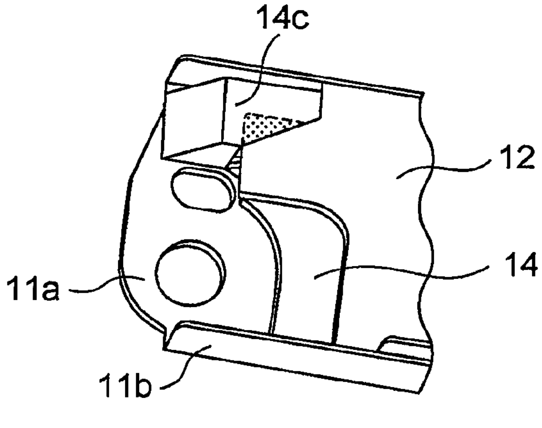
FIG. 8 is a partial perspective view illustrating a main part of the fixed blade support device according to the embodiment of this invention.
Figure 9:
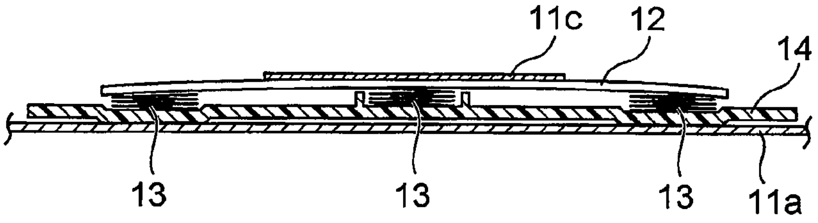
FIG. 9 is a sectional view illustrating the fixed blade support device according to the embodiment of this invention.

Referring further to FIGS. 7 to 9, this fixed blade support device further includes a spring holder 14.

The spring holder 14 is a member provided separately from the fixed blade support member 11, and is mounted between the base surface portion 11*a* of the fixed blade support member 11 and the coil spring 13 to position the coil spring 13.

As illustrated particularly in FIG. 8, the spring holder 14 includes second retainer portions 14*c* that cover respective both end portions in the blade width direction of the blade edge portion of the fixed blade 12 arranged through intermediation of the coil spring 13, and that are configured to prevent the fixed blade 12 from being disengaged in the biasing direction together with the retainer portion 11*c* of the fixed blade support member. Each of the second retainer portions 14*c* also includes a part that closes the front side of each of both the end portions in the blade width direction of the blade edge portion of the fixed blade 12 arranged through intermediation of the coil spring 13, and that prevents the fixed blade 12 from being disengaged in the engagement direction together with the upright surface portion 11*b* of the fixed blade support member 11.

In this case, the fixed blade support member 11 supports, in a rockable manner, the fixed blade 12 having a center portion in the blade width direction warped in a direction toward the movable blade 22. Further, as the coil spring, an odd number of (in this embodiment, three) coil springs 13 having the same shape are used, which correspond to the center portion and both sides of the fixed blade 12 in the blade width direction.

As illustrated particularly in FIG. 9, the spring holder 14 has such a positioning surface for the coil spring that gradually increases its height position with respect to the base surface portion 11*a* of the fixed blade support member 11 from the coil spring 13 corresponding to the outer side of the fixed blade 12 in the blade width direction to the coil spring 13 corresponding to the center portion thereof. With this, a uniform biasing force is applied to the fixed blade 12 having an appropriately designed degree of curve.

Next, the operation of this fixed blade support device is described.

Figure 10B:
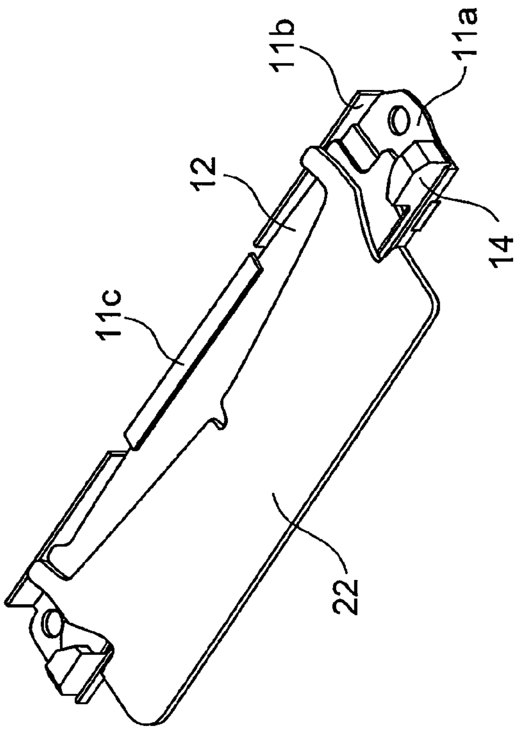
FIGS. 10A and 10B are perspective views illustrating the sheet cutting device according to the embodiment of this invention.
Figure 10A:
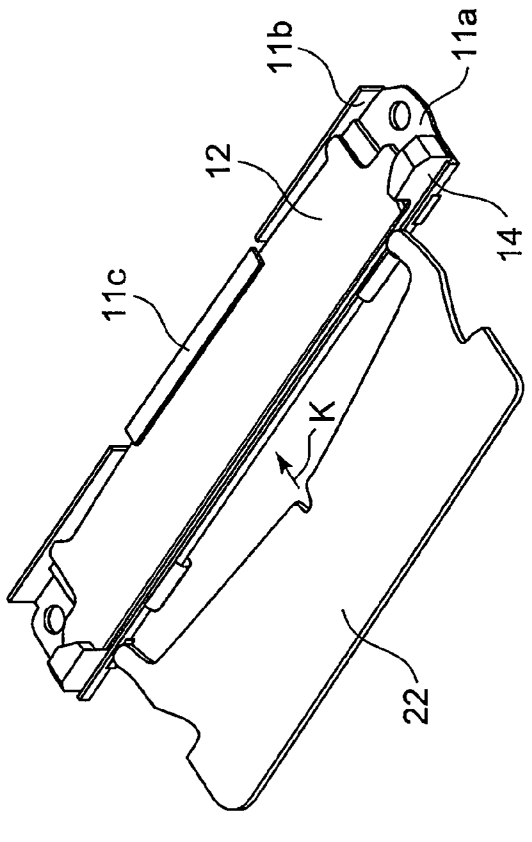
Figure 11A:
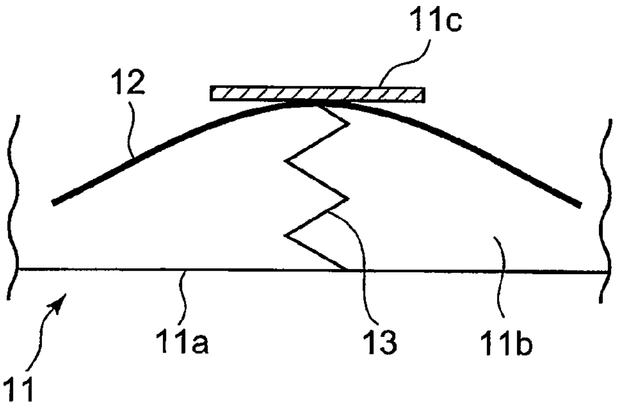
FIGS. 11A and 11B are front views illustrating the fixed blade support device according to the embodiment of this invention.
Figure 11B:
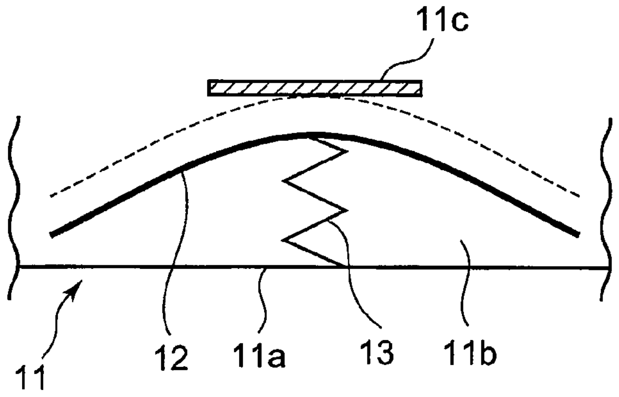

The fixed blade 12 is supported by the retainer portion 11*c* of the fixed blade support member in a rockable manner, but in the actual case, the entire fixed blade 12 including the root portion as a rocking fulcrum is also displaced at the time of engagement with the movable blade 22. That is, as the engagement of the movable blade 22 (illustrated only in FIG. 10B) with respect to the fixed blade 12 progresses as illustrated in FIGS. 10B and 11B from an initial stage at which the movable blade 22 (illustrated only in FIG. 10A) starts engagement with respect to the fixed blade 12 as illustrated in FIGS. 10A and 11A, the fixed blade 12 rocks, and the entire fixed blade 12 including the root portion is also displaced in a direction against the biasing force of the biasing direction (press-contact direction).

In this case, in this fixed blade support device, the retainer portion 11*c* prevents the fixed blade 12 from being disengaged merely in the biasing force positive direction of the biasing direction. Therefore, the fixed blade 12 is not prevented from moving in both of the direction against the biasing force of the biasing direction and the blade width direction. As a result, the fixed blade 12 having the appropriately designed degree of curve is not deformed to be flattened, etc. Therefore, as for the drive force of the drive unit for the movable blade, it is unnecessary to consider the increase of load due to the deformation such as flattening of the fixed blade, and only the load due to the degree of the curve of the fixed blade is required to be considered, and hence the drive force can be relatively reduced. Further, the normal cutting operation of this sheet cutting device utilizing the principle of scissors by the fixed blade 12 and the movable blade 22 is achieved, and the generation amount of paper powder does not increase.

Note that, in the above-mentioned embodiment, the coil spring is used as the biasing member, but another biasing member such as a plate spring may be used instead.

INDUSTRIAL APPLICABILITY

This invention has been described above by means of an embodiment. However, this invention is not limited to the embodiment. It should be understood that various modifications can be made thereto without departing from the technical scope described in the claims in this application.

This application is based upon and claims the benefit of priority from Japanese Patent Application No. 2010-279303, filed on Dec. 15, 2010, the entire disclosure of which is incorporated herein by reference.

The invention claimed is:

1. A sheet cutting device, intended for use in a printer, comprising:
- a fixed blade having a center portion, a root portion, a blade edge portion, and a side opposite the blade edge portion, the blade edge portion of the fixed blade having two ends;
- a movable blade configured to cut a sheet of printed paper by moving, in an engagement direction toward the fixed blade, and having a V-shaped blade edge portion; and
  - a fixed blade support device supporting the fixed blade,
- the fixed blade being curved so that the center portion, in a blade width direction of the fixed blade, protrudes toward the movable blade;
- the fixed blade support device comprising:
  - a biasing member configured to bias the fixed blade in a biasing direction toward the movable blade, the biasing direction being straight; and
  - a support member configured to support the fixed blade by way of the biasing member,
- the support member comprising:
  - a base surface portion on which the fixed blade is arranged, by way of the biasing member;
  - an upright surface portion that extends from the base surface portion in the biasing direction so as to close a rear side of a root portion of the fixed blade on a side opposite to a blade edge portion thereof, and is configured to prevent the fixed blade from being disengaged in the engagement direction; and
  - a retainer portion that extends from the upright surface portion so as to cover the center portion of the root portion of the fixed blade in the blade width direction,
- wherein:
  - the upright surface portion is devoid of either a blind hole or a through-hole adapted to receive the root portion of the fixed blade; and
  - the retainer portion is configured to inhibit the fixed blade from disengaging in the biasing direction from the support member while to allow the fixed blade to translate in a direction opposite to the biasing direction and in the blade width direction,
  - wherein:
- the sheet cutting device further comprises a spring holder, provided separately from the fixed blade support member, mounted between the base surface portion and the coil spring so as to position the one or more coil springs;
  - the spring holder comprises second retainer portions covering the two ends of the blade edge portion of the fixed blade in the blade width direction:
- the second retainer portions are arranged through intermediation of the one or more coil springs; and
  - the second retainer portions are configured to prevent the fixed blade from being disengaged in the biasing direction.

2. The sheet cutting device according to claim 1, wherein each of the second retainer portions of the spring holder comprises a respective part closing a front side of the two ends of the blade edge portion of the fixed blade in the blade width direction and preventing the fixed blade from being disengaged in the engagement direction.

3. A printer comprising a printer mechanism adapted to perform printing on a sheet; and a sheet cutting device according to claim 2.

4. The sheet cutting device according to claim 1, wherein:

the one or more coil springs are provided in an odd number and have a common shape;

the one or more coil springs are provided corresponding to at least the center portion and both sides of the fixed blade, in the blade width direction;

the spring holder comprises a positioning surface for the one or more coil springs; and the positioning surface gradually increases in height, with respect to the base surface portion of the fixed blade support member, from one of the one or more coil springs corresponding to an outer side of the fixed blade, to one of the one or more coil springs corresponding to the center portion of the fixed blade, so as to thereby apply a uniform biasing force to the fixed blade.

5. A printer comprising a printer mechanism adapted to perform printing on a sheet; and a sheet cutting device according to claim 4.

6. A printer comprising a printer mechanism adapted to perform printing on a sheet; and a sheet cutting device according to claim 1.

* * * * *